No. 632,281. Patented Sept. 5, 1899.
J. SCHERER.
METHOD OF REPAIRING FRACTURES IN SAW PLATES.
(Application filed July 17, 1899.)
(No Model.)
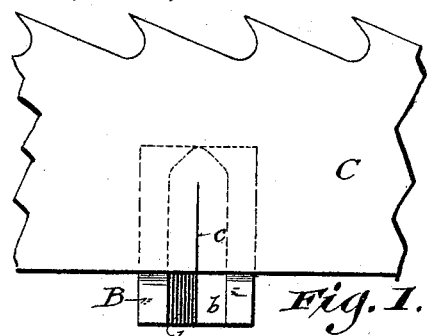
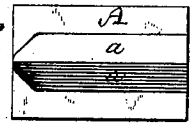
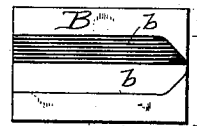
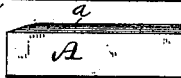
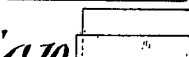
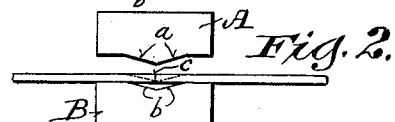
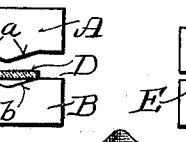
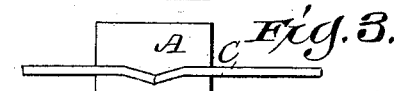
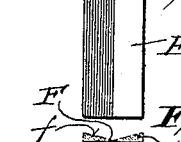
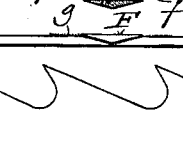
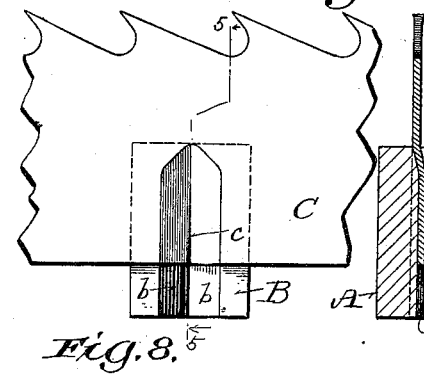
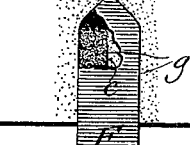
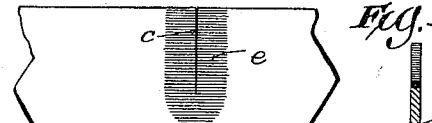
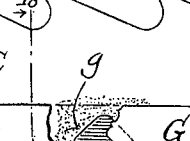
Witnesses:
Geo. N. Young.
B. C. Roloff.
Inventor
John Scherer.
By H. G. Underwood
Attorneys
THE NORRIS PETERS CO., PHOTO-LITHO., WASHINGTON, D. C.

UNITED STATES PATENT OFFICE.

JOHN SCHERER, OF MENEKAUNEE, WISCONSIN.

METHOD OF REPAIRING FRACTURES IN SAW-PLATES.

SPECIFICATION forming part of Letters Patent No. 632,281, dated September 5, 1899.

Application filed July 17, 1899. Serial No. 724,071. (No model.)

*To all whom it may concern:*

Be it known that I, JOHN SCHERER, a citizen of the United States, and a resident of Menekaunee, in the county of Marinette and State of Wisconsin, have invented certain new and useful Improvements in Methods of Repairing Fractures in Saw-Plates; and I do hereby declare that the following is a full, clear, and exact description thereof.

My invention has especial reference to the repairing of fractures in saw-plates; and it consists in a novel method of accomplishing this result, as will be fully set forth hereinafter in connection with the accompanying drawings and subsequently claimed.

In the drawings, Figure 1 is a plan view of a portion of a band-saw having a crack therein and showing the same resting upon a female die which I employ in said method of repair. Fig. 2 is an edge view of the same with the male die in position above the saw. Fig. 3 is an edge view of the same parts, but showing the male die brought down upon the saw. Fig. 4 is a plan view of the parts shown in Fig. 1 and with the male die removed after the operation shown in Fig. 3. Fig. 5 is a sectional view of the parts shown in Fig. 3, said section being taken on the plane indicated by the line 5 5 in Fig. 4. Fig. 6 is a plan view, and Fig. 6$^a$ is a side elevation, of the male die. Fig. 7 is a plan view, and Fig. 7$^a$ is a central longitudinal vertical sectional view, of the female die. Fig. 8 is an edge view of the portion of the band-saw shown in Figs. 1 to 4, showing in dotted lines the convex projection on the under side of the saw-plate formed by the dies, afterward ground or filed off. Fig. 9 is an under side plan view of the said portion of the saw-plate and indicating by horizontal shaded lines where the said convex projection had been removed by grinding or filing. Fig. 10 is a plan view of a strip of metal designed to be employed in patching the fracture, resting upon the female die. Fig. 11 is an end view of the parts shown in Fig. 10, with the male die in position above. Fig. 12 is a view of said parts with the male die brought down upon the patch. Fig. 13 is a plan view of the patch removed from the dies. Fig. 14 is an end or transverse sectional view of said patch, the upper light-shaded lines in said view indicating the portions of the patch which are to be ground or filed off. Fig. 15 is an edge view of the saw-plate, showing the patch in place thereon with an interposed film of solder, the plate and patch both having been ground or filed off at the points described. Fig. 16 is a plan view of the parts shown in the preceding figure, with the patch represented as partially broken away to show the concavity in the plate beneath. Fig. 17 is a plan view of the parts shown in the preceding figure, with a holding-plate laid over the patch and secured to the saw-plate by clamps, the said holding-plate being represented as partially broken away. Fig. 18 is a sectional view of said parts, taken on the line 18 18 of Fig. 17. Fig. 19 is a sectional view taken on the line 19 19 of Fig. 17. Fig. 20 is an edge view, and Fig. 21 a plan view, of the saw-plate after the fracture has been completely mended by the said patch.

In carrying my invention into practice I employ a pair of dies, A representing the male die, with a convex projection $a\ a$ thereon, and B the female die, with a corresponding concave depression $b\ b$ therein, these dies being held in a die-press in any suitable manner.

C represents the saw-plate, that illustrated in the present drawings being a portion of a band-saw, though this is immaterial, as a fracture in a circular or other saw can be mended by my method equally as well, the fracture being represented in the drawings by $c$. As shown in Fig. 1 of the drawings, the saw-plate is laid upon the female die B, so that the concave depression $b\ b$ thereof will extend beyond and at each side of the said fracture $c$ and with the said fracture as near as may be in line with the central longitudinal line or lowest part of the said depression $b\ b$ in the die, and then the male die A is brought down upon the plate, as shown in Figs. 2 and 3, thereby projecting the metal of the saw-plate convexly on the under side and forming a concavity in the upper side thereof corresponding to the shape of the convex and concave portions of the dies, but without altering the thickness of the saw-plate, and the saw-plate is then removed. A strip of metal D of the same thickness as that of the saw-plate is now laid upon the same female die B, and the same male die A is brought down thereupon, this bending the said strip into the same form as that of the dies and the portion of the saw-plate just removed therefrom, as shown at E, Figs. 12 and 13. The convex projecting portion (marked $d$ in Fig. 8) on the under side of the saw-plate C is next ground or filed off, as indicated at $e$ in Fig. 9, thereby reducing said under side of the plate C to a practically plane surface, and the concave side of the strip E (indicated at $ff$ in Fig. 14) is similarly ground or filed down to a practically plane surface, this strip now becoming the patch F, which is fitted above the depression in the saw-plate, with an interposed film of silver solder $g$, the convex side of the patch F resting on said film of solder, as shown in Figs. 15 and 16. A metal holding-plate G is then laid over the patch and secured to the saw-plate by suitable clamps H H, and the parts thus held together are subjected to pressure in the presence of sufficient heat to melt the solder, and when the plate G and clamps H H are removed it will be found that the plate C and patch F form a uniform plane surface and are permanently united together, the said patch thus entirely covering and mending the original fracture. The toothed edge of the saw can be mended equally as well or a broken tooth replaced in precisely the same manner, and thus by my invention the life of a saw can be indefinitely extended without altering the size or length of the said saw.

Having thus described my invention, what I claim as new, and desire to secure by Letters Patent, is—

1. In the method of repairing fractures in saw-plates, the following steps, comprising subjecting the saw-plate to pressure between dies at and beyond the line of the fracture, and separately subjecting the patching-piece to like pressure between the same dies, whereby the metal of both saw-plate and patch will be correspondingly projected convexly on the under side, and have a corresponding concavity on the upper side, without altering the thickness of either saw-plate or patch by said pressure; reducing the convex side of the saw-plate and concave side of the patch to practically plane surfaces, and then uniting the patch and plate by heat, pressure and solder to form a uniform smooth plane surface over the line of the original fracture.

2. The method of repairing fractures in saw-plates, consisting in subjecting the saw-plate to pressure between dies at and beyond the line of the fracture, thereby projecting the metal of the saw-plate convexly on the under side and forming a concavity on the upper side, without altering the thickness of the saw-plate; pressing a strip of metal between the same dies to form the patch; grinding or filing off the convex projecting portion on the under side of the saw-plate to practically restore the plane surface on that side; grinding or filing the concave side of the patch to reduce that side to a practically plane surface; laying a strip of solder in the concave side of the saw-plate; laying the patch in place above the depression in the saw-plate with its convex side upon said solder, and holding the plate and patch together, and subjecting the parts thus held together to pressure in the presence of sufficient heat to melt the solder.

In testimony that I claim the foregoing I have hereunto set my hand, at Menekaunee, in the county of Marinette and State of Wisconsin, in the presence of two witnesses.

JOHN SCHERER.

Witnesses:
M. O. KOHLER,
MICHAEL CORRY, Jr.